US010969026B2

(12) United States Patent
Matsuura (10) Patent No.: US 10,969,026 B2
(45) Date of Patent: Apr. 6, 2021

(54) VALVE DEVICE

(71) Applicant: KYB Corporation, Tokyo (JP)

(72) Inventor: Akio Matsuura, Kanagawa (JP)

(73) Assignee: KYB CORPORATION, Tokyo (JP)

( * ) Notice: Subject to any disclaimer, the term of this patent is extended or adjusted under 35 U.S.C. 154(b) by 0 days.

(21) Appl. No.: 16/755,003

(22) PCT Filed: May 15, 2019

(86) PCT No.: PCT/JP2019/019363
§ 371 (c)(1),
(2) Date: Apr. 9, 2020

(87) PCT Pub. No.: WO2020/008736
PCT Pub. Date: Jan. 9, 2020

(65) Prior Publication Data
US 2020/0348699 A1    Nov. 5, 2020

(30) Foreign Application Priority Data

Jul. 6, 2018 (JP) .............................. JP2018-129127

(51) Int. Cl.
*F16K 11/07* (2006.01)
*F16K 3/24* (2006.01)
(Continued)

(52) U.S. Cl.
CPC ............... *F16K 11/07* (2013.01); *E02F 9/02* (2013.01); *F16K 3/24* (2013.01); *F16K 31/1225* (2013.01);
(Continued)

(58) Field of Classification Search
CPC ........ F16K 11/07; F16K 3/24; F16K 31/1225; E02F 9/02; F15B 11/22; G05D 7/0126; Y10T 137/8671
See application file for complete search history.

(56) References Cited

U.S. PATENT DOCUMENTS 2,475,298 A * 7/1949 Sloane .................... F15B 13/08
60/471
3,804,123 A * 4/1974 Marshall ................. F15B 13/04
137/625.69
(Continued)

FOREIGN PATENT DOCUMENTS

JP          2006-082767 A        3/2006
JP          2010151189      *   7/2010  ........... F16K 31/122
(Continued)

*Primary Examiner* — Umashankar Venkatesan
(74) *Attorney, Agent, or Firm* — Rabin & Berdo, P.C.

(57) ABSTRACT

In a valve device, travel control valve unit has a communication path causing the lead-out passages of the left and right travel control valve units to communicate with each other, and a spool has a lead-out side land portion configured to cause communication or shut-off of the communication between the lead-out passage and the communication path, a discharge-side land portion configured to cause communication or shut-off of the communication between the actuator passage and the discharge passage, a discharge portion configured to discharge a part of the working fluid led from the supply passage to the lead-out passage to the discharge passage at a movement initial stage of the spool, and a communication portion configured to cause the lead-out passage and the communication path to communicate with each other at a movement final stage of the spool.

5 Claims, 7 Drawing Sheets (51) Int. Cl.
*E02F 9/02* (2006.01)
*F16K 31/122* (2006.01)
*G05D 7/01* (2006.01)

(52) U.S. Cl.
CPC ...... *G05D 7/0126* (2013.01); *Y10T 137/8671* (2015.04)

(56) References Cited

U.S. PATENT DOCUMENTS

| | | | | |
|---|---|---|---|---|
| 4,238,112 A | * | 12/1980 | Derozier | F15B 13/04 137/625.65 |
| 2011/0192474 A1 | * | 8/2011 | Kobayashi | F15B 13/027 137/528 |

FOREIGN PATENT DOCUMENTS

| | | | | |
|---|---|---|---|---|
| JP | 2013181625 A | * | 9/2013 | |
| JP | 6600386 B1 | * | 10/2019 | ............. F16K 27/00 |
| WO | WO-2017212681 A1 | * | 12/2017 | ........... F16K 31/122 |

* cited by examiner

VALVE DEVICE

TECHNICAL FIELD

The present invention relates to a valve device.

BACKGROUND ART

A hydraulic driving device including left and right travel control valves adapted to control a flow of a working fluid to left and right travel motors is known (see JP2006-82767A). In an art described in JP2006-82767A, straight travel correction is made for meandering travel by making flowrates of the working fluid supplied to the left and right travel motors equal by causing supply passages supplying the working fluid to left and right travel control valves to communicate with each other through a two-position switching valve so as to improve travel performances.

SUMMARY OF INVENTION

In recent years, not only a demand for improvement of the travel performances but also a demand for size reduction has been growing. However, in the art described in JP2006-82767A, the two-position switching valve causing the left and right travel control valves to communicate with each other is needed, and there is a problem that size reduction is difficult.

The present invention has an object to provide a valve device which can improve the travel performances and reduce the size.

According to one aspect of the present invention, a valve device includes left and right travel control valve units configured to control a flow of a working fluid supplied from a fluid pressure pump to left and right travel motors. Each of the left and right travel control valve units includes: a spool configured to be moved in an axial direction on the basis of a travel operation instruction; and a valve body slidably accommodating the spool. The valve body has: a supply passage to which the working fluid discharged from the fluid pressure pump is supplied; an actuator passage communicating with the travel motor; a discharge passage communicating with a tank; a lead-out passage leading the working fluid supplied from the supply passage to the actuator passage; and a communication path causing the lead-out passages of the left and right travel control valve units to communicate with each other. The spool has: a lead-out side land portion which is a land portion configured to cause communication or shut-off of the communication between the lead-out passage and the communication path, the lead-out side land portion being capable of shutting off the lead-out passage by an outer peripheral surface thereof; a discharge-side land portion which is the land portion configured to cause communication or shut-off of the communication between the actuator passage and the discharge passage, the discharge-side land portion being capable of shutting off the discharge passage by the outer peripheral surface thereof; a discharge portion provided at least either one of the lead-out side land portion and the discharge-side land portion and configured to discharge a part of the working fluid led from the supply passage to the lead-out passage to the discharge passage at a movement initial stage thereof when the spool is moved to one from the neutral position; and a communication portion provided on the lead-out side land portion and configured to cause the lead-out passage and the communication path to communicate with each other at a movement final stage thereof when the spool is moved to the one from the neutral position.

DESCRIPTION OF EMBODIMENTS

A valve device according to embodiments of the present invention will be described by referring to the drawings. The valve device is mounted on a work machine such as a construction machine, an agricultural machine, an industrial machine and the like including a travel device. Hereinafter, the valve device mounted on a crawler-type hydraulic excavator as a work machine will be described as an example. Moreover, an example in which a working oil is used as a working fluid for driving of an actuator in the work machine will be described, but other fluids such as working water or the like may be used for the working fluid.

Though not shown, the hydraulic excavator includes a travel portion, a turning portion provided turnably on an upper part of the travel portion, and an excavating portion provided on the turning portion. The travel portion has a pair of left and right crawlers. When the pair of left and right crawlers are driven by left and right travel motors which will be described later, the hydraulic excavator is made to travel. The excavating portion includes a boom mounted rotatably on the turning portion, an arm rotatably mounted on the boom, and a bucket rotatably mounted on the arm.

First Embodiment

Figure 1:
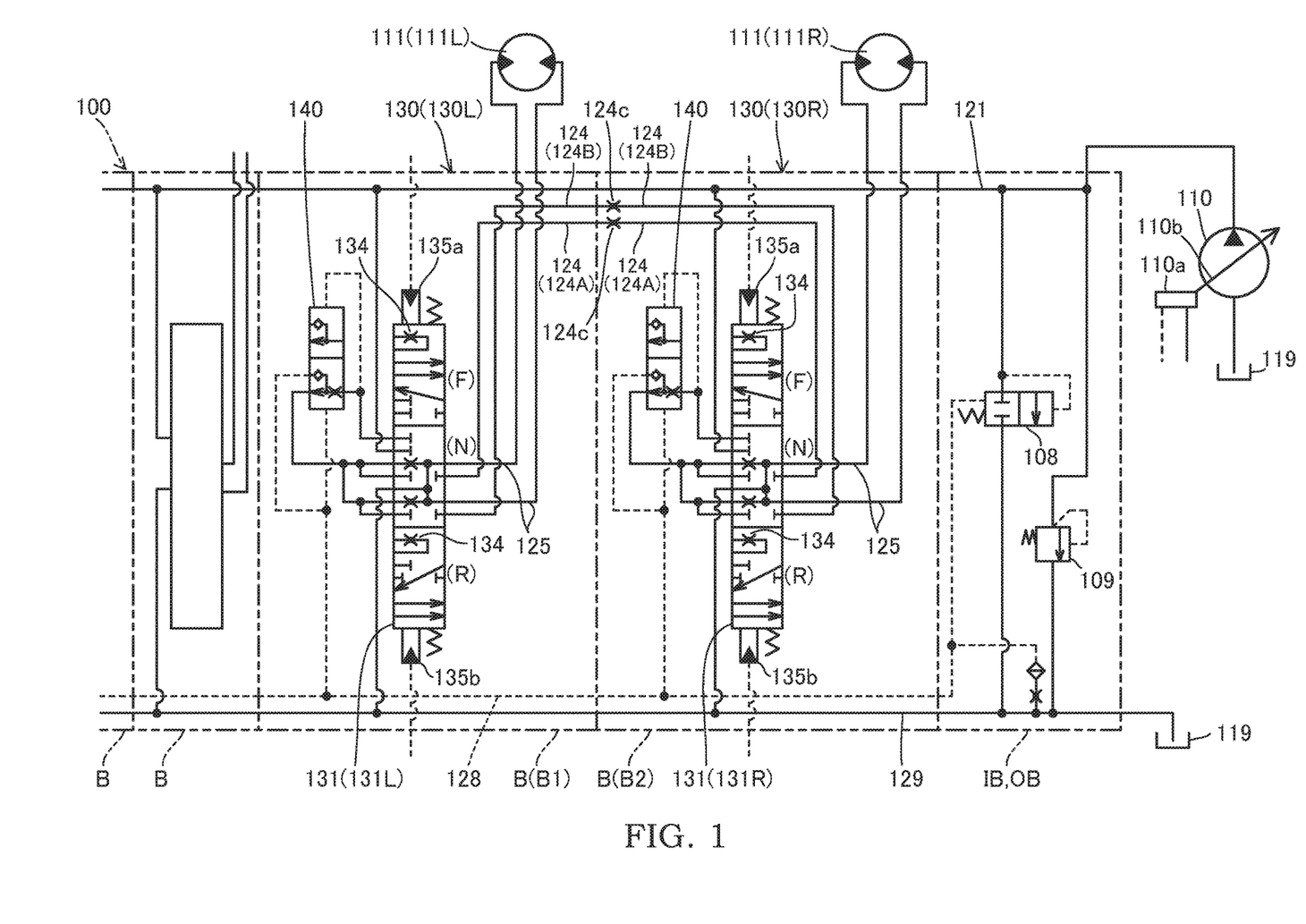
FIG. 1 is a hydraulic circuit diagram illustrating a configuration of a valve device according to a first embodiment of the present invention.

FIG. 1 is a hydraulic circuit diagram illustrating a configuration of a valve device 100. As illustrated in FIG. 1, the hydraulic excavator includes an engine (not shown), a pump 110 as a fluid pressure pump driven by the engine and discharges a working oil, the valve device 100 adapted to control a plurality of actuators adapted to drive the travel portion, the turning portion, the excavating portion and the like by the working oil discharged from the pump 110, and a tank 119 through which the working oil circulates from the valve device 100.

The plurality of actuators includes travel motors 111 (a left travel motor 111L and a right travel motor 111R) which are hydraulic motors adapted to drive the travel portion, a hydraulic motor (not shown) adapted to drive the turning portion, a hydraulic cylinder (not shown) adapted to drive the boom, a hydraulic cylinder (not shown) adapted to drive the arm, a hydraulic cylinder (not shown) adapted to drive the bucket and the like.

The pump 110 is a variable capacity type piston pump, and a discharge capacity is changed by changing inclination of a swash plate 110b by a regulator 110a. The discharge capacity of the pump 110 is controlled by so-called load sensing control so that a differential pressure between a discharge pressure of the pump 110 led to the regulator 110a and a highest load pressure of each actuator (the highest load pressure in the load pressures of the plurality of actuators) becomes a predetermined value.

The valve device 100 includes a plurality of valve units and controls an operation of each actuator by an actuator control valve incorporated in each of valve units. By referring to FIG. 1, the valve device 100 will be described in detail. A housing of the valve device 100 is formed by laminating and fastening a valve body of each of the valve units. The valve body of each of the valve units is formed having a cuboid shape.

The valve bodies constituting the housing of the valve device 100 include a valve block B which is a valve body in which each of the actuator control valves is incorporated, an inlet block IB which is a valve body for taking in the working oil and the like. The inlet block IB is also an outlet block OB for discharging the working oil to a tank 119.

A supply passage 121 to which the working oil discharged from the pump 110 is supplied and a discharge passage 129 communicating with the tank 119 are provided in each of the valve bodies (IB, B). In the inlet block IB, a relief valve 109 interposed between the supply passage 121 and the discharge passage 129 and an unload valve 108 are incorporated. The relief valve 109 regulates a highest pressure of a discharge pressure of the pump 110 and protects the hydraulic circuit. The unload valve 108 leads the working oil discharged from the pump 110 to the tank 119 and drives the pump 110 with no load (unload), when each of the actuators is not operated.

The actuator control valve adapted to control the flow of the working oil supplied from the pump 110 to the actuator and a pressure compensation valve associated with the actuator control valve are incorporated in each of the valve blocks B. In FIG. 1, travel control valve units 130 (a left travel control valve unit 130L and a right travel control valve unit 130R) in which travel control valves 131 (a left travel control valve 131L and a right travel control valve 131R) which are actuator control valves adapted to drive the travel motors 111 (the left travel motor 111L and the right travel motor 111R) and a pressure compensation valve 140 associated with the travel control valves 131 are incorporated are illustrated. On the other hand, in FIG. 1, valve units in which the actuator control valves adapted to control the actuators such as the boom, the arm, the bucket and the like are incorporated are simplified or omitted.

Each of the actuator control valves is switched by a pilot pressure output in accordance with an operation of an operation lever (not shown).

In a hydraulic system of this embodiment, an after-orifice type load sensing system in which the pressure compensation valve 140 is provided on a downstream side of a meter-in throttle 134 of each of the actuator control valves is employed. In such load sensing system, when a plurality of the actuators is operated at the same time, the pressure compensation valve 140 functions in order to adjust loads among each of the actuators.

A pressure on the downstream side of the meter-in throttle 134 provided on the actuator control valve and a highest load pressure (the highest load pressure in the load pressures of the plurality of actuators) of each of the actuators are given to the pressure compensation valve 140. The pressure compensation valve 140 executes compensation so that the pressure on the downstream side of the meter-in throttle 134 becomes a pressure higher than the highest load pressure of each of the actuators only by a predetermined value. Therefore, in the hydraulic system according to this embodiment, when the plurality of actuator control valves is driven at the same time, the working oil in a flowrate according to an operation amount of a spool of the actuator control valve can be supplied regardless of a magnitude of the load pressure of the actuator.

The left travel control valve 131L adapted to control the flow of the working oil supplied from the pump 110 to the left travel motor 111L is incorporated in a valve block B1. As a result, the left travel control valve unit 130L having the valve block B1 and the left travel control valve 131L is constituted. The left travel motor 111L is a hydraulic motor adapted to drive a crawler (not shown) on the left side of the hydraulic excavator. The right travel control valve 131R adapted to control the flow of the working oil supplied from the pump 110 to the right travel motor 111R is incorporated in a valve block B2 adjacent to the valve block B1. As a result, the right travel control valve unit 130R having the valve block B2 and the right travel control valve 131R is constituted. The right travel motor 111R is a hydraulic motor adapted to drive a crawler (not shown) on the right side of the hydraulic excavator.

As described above, in this embodiment, the left travel control valve unit 130L and the right travel control valve unit 130R are disposed so as to be adjacent to each other and constitute the valve device 100 by being laminated with the other valve units. The left travel control valve unit 130L and the right travel control valve unit 130R have the similar configuration and present substantially planar symmetrical shapes with respect to contact surfaces thereof.

The travel control valve 131 is a pilot-type directional switching valve switching among a neutral position (N) where the travel motor 111 is stopped, a forward position (F) which is an operation position where the travel motor 111 is rotated in one direction, and a reverse position (R) which is an operation position where the travel motor 111 is rotated in the other direction.

When the travel control valve 131 is at the neutral position (N), communication between the pump 110 and the travel motor 111 is shut off, and the travel motor 111 and the tank 119 communicate with each other. When the travel control valve 131 is at the operation position (the forward position (F) or the reverse position (R)), the pump 110 and the travel motor 111 communicate with each other, and the communication between the travel motor 111 and the tank 119 is shut off.

Figure 2:
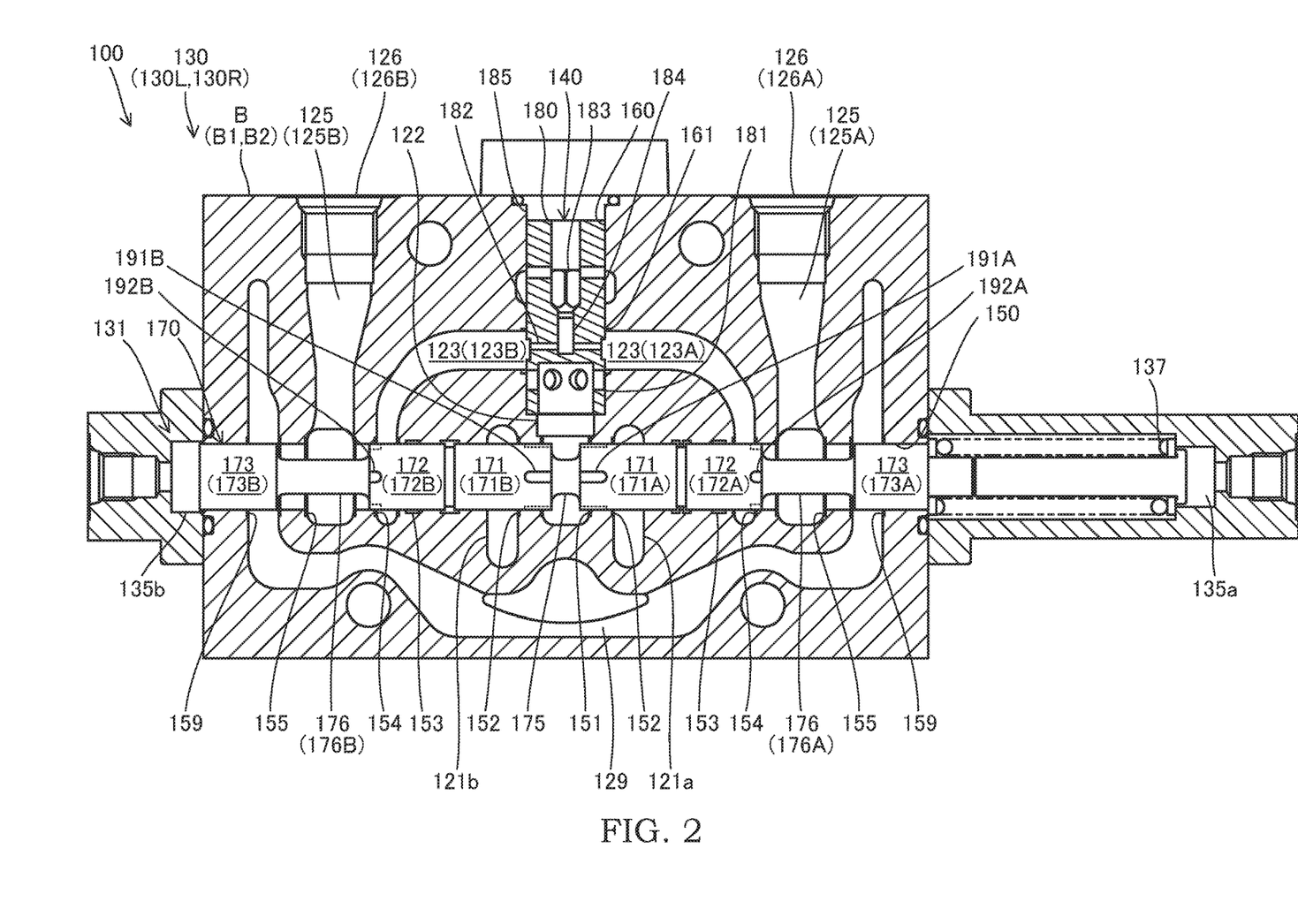
FIG. 2 is a sectional view illustrating a travel control valve unit of the valve device according to the first embodiment of the present invention and illustrates a state where a main spool is at a neutral position.

The travel control valve unit 130 will be described in detail by referring mainly to FIGS. 1 and 2. FIG. 2 is a sectional view illustrating the travel control valve unit 130 of the valve device 100 and illustrates a state where a main spool 170 is at the neutral position (N).

Each of the left and right travel control valve units 130L and 130R has a meter-in throttle 134 (see FIG. 1) provided between the pump 110 and the travel motor 111, the main spool 170 which is a spool moved in an axial direction on the basis of a travel operation instruction, a compensator spool 180 moved in a direction orthogonal to the axial direction of the main spool 170, and the valve block B accommodating the main spool 170 and the compensator spool 180.

A main accommodating hole 150 slidably accommodating the main spool 170 and a sub accommodating hole 160 slidably accommodating the compensator spool 180 are provided in the valve block B.

The travel operation instruction corresponds to a pilot pressure output from a pilot pressure output portion (not shown) to a first pilot pressure chamber 135a or a second pilot pressure chamber 135b which will be described later in accordance with the operation amount of a travel operation lever (not shown).

Structures of the valve block B and the main spool 170 have substantially symmetrical shapes.

The travel control valve 131 includes the main spool 170, the first pilot pressure chamber 135a and the second pilot pressure chamber 135b controlling driving of the main spool 170, and a centering spring 137 biasing the main spool 170 toward a center in the axial direction thereof.

The main spool 170 is held at the neutral position (N) by a biasing force of the centering spring 137 when the first pilot pressure chamber 135a and the second pilot pressure chamber 135b are connected to the tank 119, and a pilot pressure does not act on the first pilot pressure chamber 135a and the second pilot pressure chamber 135b. When the pilot pressure acts on the first pilot pressure chamber 135a, the main spool 170 is switched to the forward position (F), while when the pilot pressure acts on the second pilot pressure chamber 135b, the main spool 170 is switched to the reverse position (R).

In the valve block B, the supply passage 121 (see FIG. 1) to which the working oil discharged from the pump 110 is supplied, a pair of supply branch passages 121a and 121b branching from the supply passage 121, a lead-in passage 122 constituting a passage on a downstream side of the meter-in throttle 134 and on an upstream side of the pressure compensation valve 140, a pair of lead-out passages 123 (a first lead-out passage 123A and a second lead-out passage 123B) constituting a passage on the downstream side of the pressure compensation valve 140, a first travel communication path 124A (see FIGS. 1 and 4) causing the first lead-out passage 123A of the left travel control valve unit 130L and the first lead-out passage 123A of the right travel control valve unit 130R to communicate with each other, a second travel communication path 124B (see FIG. 1) causing the second lead-out passage 123B of the left travel control valve unit 130L and the second lead-out passage 123B of the right travel control valve unit 130R to communicate with each other, a pair of actuator passages 125 (a first actuator passage 125A and a second actuator passage 125B) communicating with the travel motor 111, a discharge passage 129 communicating with the tank 119, and a load pressure passage 128 (see FIG. 1) to which the highest load pressure in the plurality of actuators controlled by the valve device 100 is led are provided.

The pair of lead-out passages 123 constitute a so-called bridge passage which presents a bridge shape. The pair of lead-out passages 123 are passages provided on the downstream side of the meter-in throttle 134 and leading the working oil supplied from the supply passage 121 to the actuator passage 125.

Figure 4:
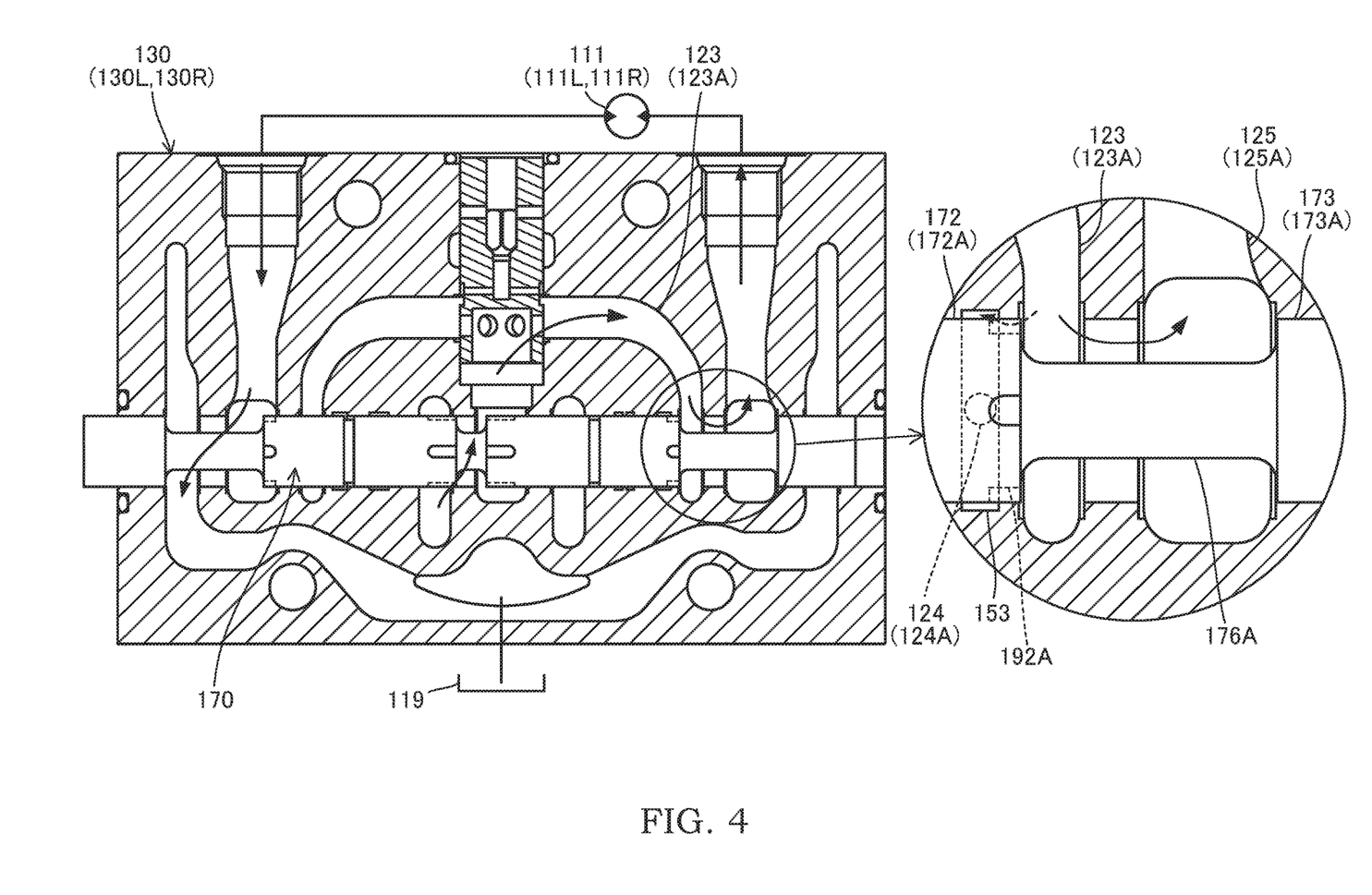
FIG. 4 is a sectional view illustrating the travel control valve unit of the valve device according to the first embodiment of the present invention and illustrates a state where the main spool is at a position of a movement final stage, and a lead-out passage on a downstream side of a meter-in throttle communicates with a travel communication path through a first notch as a communication portion.

The travel communication path 124 illustrated in FIGS. 1 and 4 (the first travel communication path 124A and the second travel communication path 124B) are communication paths causing the lead-out passages 123 of the left and right travel control valve units 130L and 130R to communicate with each other (causing the first lead-out passages 123A to communicate with each other, and causing the second lead-out passages 123B to communicate with each other) and provided in order to make the flowrates of the working oil supplied to the left and right travel motors 111 equal. In this embodiment, the travel communication path 124 extends in a width direction of the valve block B (a direction perpendicular to the drawing in FIG. 4).

As illustrated in FIG. 1, a throttle 124c which gives resistance to the passing working oil is provided in the travel communication path 124 of the right travel control valve unit 130R. The throttle 124c may be provided in the travel communication path 124 of the left travel control valve unit 130L or may be provided both in the travel communication path 124 of the left travel control valve unit 130L and the travel communication path 124 of the right travel control valve unit 130R.

As illustrated in FIG. 2, a plurality of annular recess portions 151, 152, 153, 154, 155, and 159 connected to each of the passages 122, 121a, 121b, 124, 123, 125, and 129 are provided on an inner peripheral surface of the main accommodating hole 150. The lead-in passage 122 is connected to the annular recess portion 151 provided at a center of the main accommodating hole 150 in the axial direction and the sub accommodating hole 160. The pair of supply branch passages 121a and 121b are connected to the pair of annular recess portions 152 provided so as to sandwich the annular recess portion 151. The pair of travel communication paths 124 are connected to the pair of annular recess portions 153 provided so as to sandwich the pair of annular recess portions 152.

The pair of lead-out passages 123 are connected to the pair of annular recess portions 154 provided so as to sandwich the pair of annular recess portions 153. The pair of actuator passages 125 are connected to the pair of annular recess portions 155 provided so as to sandwich the pair of annular recess portions 154. The discharge passage 129 is connected to the pair of annular recess portions 159 provided so as to sandwich the pair of annular recess portions 155.

The pair of actuator passages 125 (the first actuator passage 125A and the second actuator passage 125B) connect a pair of actuator ports 126 (a first actuator port 126A and a second actuator port 126B) opened in an outer peripheral surface of the valve block B and the pair of annular recess portions 155 to each other.

The compensator spool 180 is interposed between the pair of lead-out passages 123 constituting the bridge passage. An annular recess portion 161 connected to the pair of lead-out passages 123 is provided on the inner peripheral surface the sub accommodating hole 160. That is, the lead-out passage 123 has one end communicating with the main accommodating hole 150 and the other end communicating with the sub accommodating hole 160.

The main spool 170 has a plurality of columnar land portions in sliding contact with the inner peripheral surface of the main accommodating hole 150. The plurality of land portions includes a pair of supply-side land portions 171, that is, a first supply-side land portion 171A and a second supply-side land portion 171B provided at a center part of the main spool 170 in the axial direction, a pair of lead-out side land portions 172, that is, a first lead-out side land portion 172A and a second lead-out side land portion 172B provided so as to sandwich the pair of supply-side land portions 171, and a pair of discharge-side land portions 173, that is, a first discharge-side land portion 173A and a second discharge-side land portion 173B provided so as to sandwich the pair of lead-out side land portions 172.

Each of the land portions is provided in an order of the first discharge-side land portion 173A, the first lead-out side land portion 172A, the first supply-side land portion 171A, the second supply-side land portion 171B, the second lead-out side land portion 172B, and the second discharge-side land portion 173B from one end in the axial direction (right end in the illustration) toward the other end in the axial direction (left end in the illustration).

The supply-side land portion 171 is a land portion causing the supply passage 121 and the lead-in passage 122 to communicate with each other or shuts off the communication thereof. The pair of supply-side land portions 171 are constituted, capable of shutting off the pair of supply branch passages 121a and 121b by the outer peripheral surface thereof.

The lead-out side land portion 172 is a land portion causing the lead-out passage 123 and the actuator passage 125 to communicate with each other or shuts off the communication thereof and also a land portion causing the lead-out passage 123 and the travel communication path 124 to communicate with each other or shuts off the communication thereof. The pair of lead-out side land portions 172 are constituted, capable of shutting off the pair of lead-out side passages 123 by the outer peripheral surface thereof.

The discharge-side land portion 173 is a land portion causing the actuator passage 125 and the discharge passage 129 to communicate with each other or shuts off the communication thereof. The pair of discharge-side land portions 173 are constituted, capable of shutting off the discharge passages 129 by the outer peripheral surface thereof.

An annular groove is provided among each of the land portions. A first annular groove 176A is provided between the first lead-out side land portion 172A and the first discharge-side land portion 173A. A second annular groove 176B is provided between the second lead-out side land portion 172B and the second discharge-side land portion 173B. The first annular groove 176A and the second annular groove 176B are also collectively called the annular groove 176. A central annular groove 175 is provided between the first supply-side land portion 171A and the second supply-side land portion 171B.

The central annular groove 175 is provided so as to face the lead-in passage 122 and communicates with the lead-in passage 122 at all times. The first annular groove 176A is provided so as to face the first actuator passage 125A and communicates with the first actuator passage 125A at all times. The second annular groove 176B is provided so as to face the second actuator passage 125B and communicates with the second actuator passage 125B at all times.

A plurality of first central notches 191A is provided separately in a circumferential direction on the first supply-side land portion 171A. The first central notches 191A extend to the axial direction of the main spool 170 and are opened in the outer peripheral surface in the first supply-side land portion 171A and the central annular groove 175. A plurality of second central notches 191B is provided separately in the circumferential direction on the second supply-side land portion 171B. The second central notches 191B extend to the axial direction of the main spool 170 and are opened in the outer peripheral surface in the second supply-side land portion 171B and the central annular groove 175.

A plurality of first notches 192A is provided separately in a circumferential direction on the first lead-out side land portion 172A. The first notches 192A extend to the axial direction of the main spool 170 and are opened in the outer peripheral surface in the first lead-out side land portion 172A and the first annular groove 176A. A plurality of second notches 192B is provided separately in the circumferential direction on the second lead-out side land portion 172B. The second notches 192B extend to the axial direction of the main spool 170 and are opened in the outer peripheral surface in the second lead-out side land portion 172B and the second annular groove 176B.

The compensator spool 180 is disposed so as to have one end (lower end in the illustration) faced with the lead-in passage 122 and the other end (upper end in the illustration) faced with the highest load pressure chamber 185. The highest load pressure chamber 185 communicates with the load pressure passage 128 (see FIG. 1) and is a pressure chamber to which the highest load pressure of each of the actuators is led.

A throttle portion 181 which gives resistance to the passing working oil at an initial stage at which the compensator spool 180 is moved to the highest load pressure chamber 185 side is provided in the compensator spool 180. An opening degree of the throttle portion 181 with respect to the annular recess portion 161 becomes larger as the compensator spool 180 is moved to the highest load pressure chamber 185 side.

Moreover, a pressure introduction portion 182 which makes the opening degree with respect to the annular recess portion 161 variable in accordance with its moved position is provided in the compensator spool 180. A groove is formed around the opening portion on the annular recess portion 161 side in the pressure introduction portion 182, and in a process in which this groove is moved with respect to the annular recess portion 161, the substantial opening degree of the pressure introduction portion 182 to the annular recess portion 161 becomes small. That is, the opening degree of the pressure introduction portion 182 to the annular recess portion 161 becomes smaller as the compensator spool 180 is moved to the highest load pressure chamber 185 side.

A high-pressure selection valve 183 is incorporated in the compensator spool 180. The high-pressure selection valve 183 is disposed with one end (lower end in the illustration) faced with a pressure introduction chamber 184 communicating with the pressure introduction portion 182 and the other end (upper end in the illustration) faced with the highest load pressure chamber 185. The high-pressure selection valve 183 maintains a closed valve state when the pressure of the highest load pressure chamber 185, that is, the highest load pressure of each of the actuators is higher than the pressure of the pressure introduction chamber 184. On the other hand, the high-pressure selection valve 183 opens the valve when the pressure of the pressure introduction chamber 184 is higher than the pressure of the highest load pressure chamber 185 and leads the pressure of the pressure introduction chamber 184 to the load pressure passage 128 (see FIG. 1).

Figure 3:
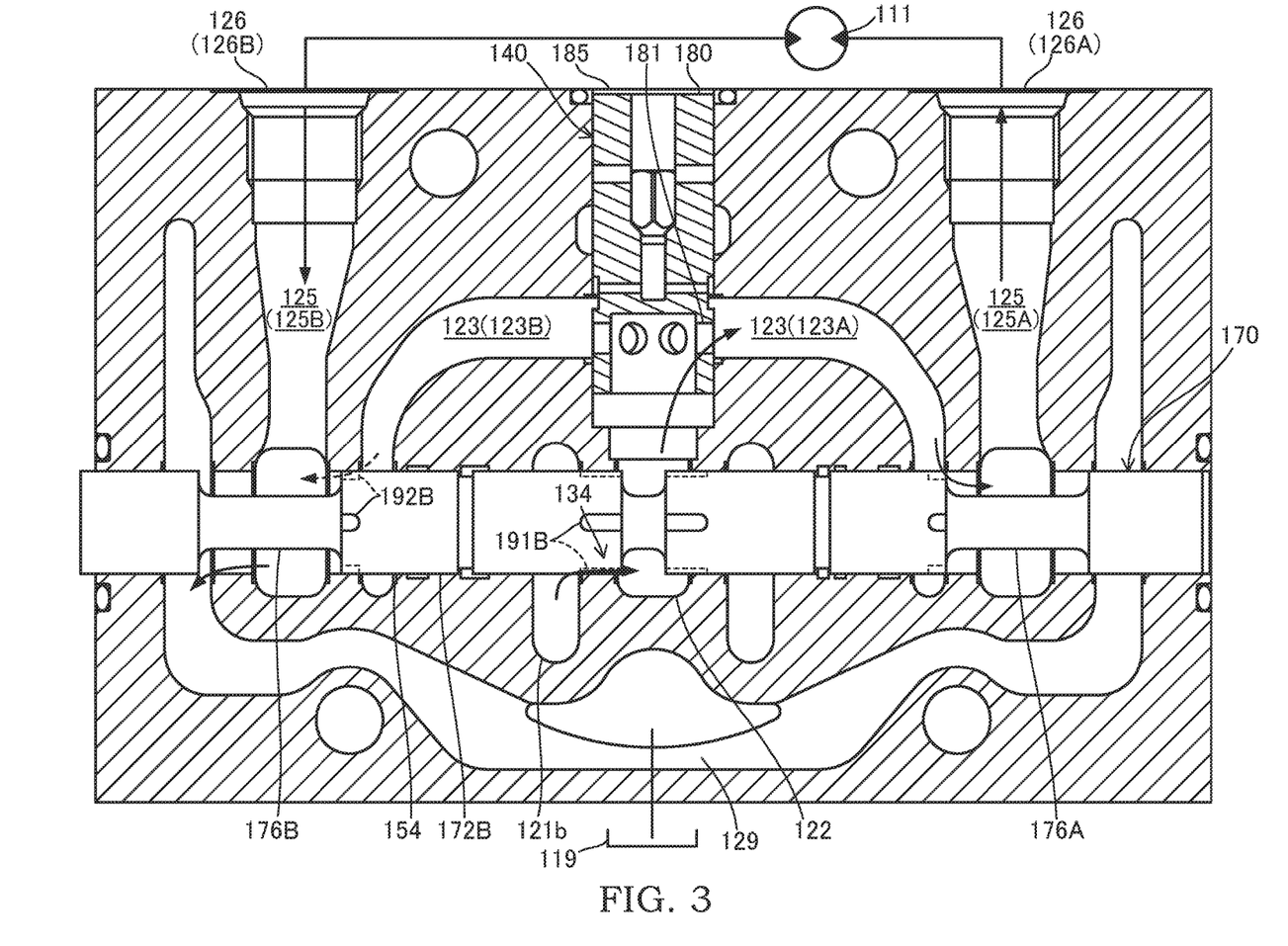
FIG. 3 is a sectional view illustrating the travel control valve unit of the valve device according to the first embodiment of the present invention and illustrates a state where the main spool is at a position of a movement initial stage and a part of a working oil from a second notch as a discharge portion (bleed-off throttle) is discharged to a tank.

The operation of the valve device 100 according to the first embodiment will be described by referring to FIGS. 2 to 4. FIGS. 3 and 4 are sectional views illustrating the travel control valve unit 130 of the valve device 100 similarly to FIG. 2. FIG. 3 illustrates a state where the main spool 170 is at a position at a movement initial stage, and a part of the working oil is discharged to the tank 119 from the second notch 192B as the discharge portion (bleed-off throttle). FIG. 4 illustrates a state where the main spool 170 is at a position of a movement final stage, and the lead-out passage 123 on the downstream side of the meter-in throttle 134 communicates with the travel communication path 124 through the first notch 192A as the communication portion.

When an operator of the hydraulic excavator operates the travel operation lever (not shown) provided in a cabin, the pilot pressure as the travel operation instruction acts on the first pilot pressure chamber 135*a* or the second pilot pressure chamber 135*b* of the travel control valve 131. In the case of the straight travel, the operator tilts the left travel operation lever to the forward side and the right travel operation lever to the forward side. Hereinafter, the operations of the main spool 170 and the compensator spool 180 and the flow of the working oil in the travel control valve unit 130 will be described in detail as the operation of the valve device 100 when the hydraulic excavator (vehicle) is to travel straightly by operating the left and right travel operation levers (not shown) to the forward side at the same time.

When the travel operation lever is held at the neutral position, the main spool 170 of the travel control valve 131 is held at the neutral position (N) (see FIG. 2). When the main spool 170 is at the neutral position (N), the opening of the annular recess portion 152 connected to the supply branch passages 121*a* and 121*b* is closed by the outer peripheral surface of the supply-side land portion 171. That is, when the main spool 170 is at the neutral position (N), the communication between the supply passage 121 and the lead-in passage 122 is shut off by the supply-side land portion 171.

Moreover, when the main spool 170 is at the neutral position (N), the first actuator passage 125A and the discharge passage 129 communicate with each other through the first annular groove 176A, and the second actuator passage 125B and the discharge passage 129 communicate with each other through the second annular groove 176B.

When the main spool 170 is held at the neutral position (N), the first actuator passage 125A and the second actuator passage 125B communicate with each other through the first annular groove 176A, the first notch 192A, the pair of lead-out passages 123 constituting the bridge passage, the second notch 192B, and the second annular groove 176B.

When the operation of the travel operation lever to the forward side is started, the pilot pressure acts on the first pilot pressure chamber 135*a*, and the main spool 170 starts moving from the neutral position (N) to one in the axial direction (left in the illustration). As illustrated in FIG. 3, when the main spool 170 moves from the neutral position (N) to the one in the axial direction, the supply branch passage 121*b* and the lead-in passage 122 communicate with each other through the second central notch 191B. The communication opening portion at this time constitutes the meter-in throttle 134 illustrated in FIG. 1. The pressure of the working oil led to the lead-in passage 122 becomes lower than a pump discharge pressure only by a pressure loss according to the opening degree of the meter-in throttle 134.

When the working oil is led to the lead-in passage 122, the compensator spool 180 of the pressure compensation valve 140 is moved upward in the illustration against the action of the pressure of the highest load pressure chamber 185 by an action of the pressure of the lead-in passage 122. When the compensator spool 180 is moved upward in the illustration, the opening degree of the throttle portion 181 becomes larger. Thus, as the opening degree of the throttle portion 181 becomes larger, the flowrate of the working oil led from the lead-in passage 122 to the first actuator passage 125A through the first lead-out passage 123A and the first annular groove 176A is increased.

The working oil led to the first actuator passage 125A is supplied to the travel motor 111 through the first actuator port 126A, and the travel motor 111 is rotated. The working oil discharged from the travel motor 111 is led to the second actuator passage 125B through the second actuator port 126B. The working oil led to the second actuator passage 125B is led to the discharge passages 129 through the second annular groove 176B and is discharged to the tank 119.

As described above, when the main spool 170 is moved to the one in the axial direction from the neutral position (N), at the movement initial stage, most of the working oil led from the supply passage 121 to the lead-out passage 123 through the lead-in passage 122 is supplied to the first actuator passages 125A through the first annular groove 176A as indicated by a solid-line arrow in the figure, and the travel motor 111 is rotated.

At this time, the second lead-out passage 123B communicates with the second annular groove 176B through the second notch 192B. Thus, as indicated by a broken-line arrow in the illustration, a part of the working oil led from the supply passage 121 to the lead-out passage 123 through the lead-in passage 122 is discharged to the discharge passage 129 through the second notch 192B and the second annular groove 176B.

That is, when the main spool 170 is moved to the one in the axial direction from the neutral position (N), at the movement initial stage, a part of the working oil led from the supply passage 121 to the lead-out passage 123 is discharged to the discharge passage 129 through the second notch 192B as the discharge portion (bleed-off throttle) provided on the second lead-out side land portion 172B. An area of the throttle opening of the second notch 192B as the bleed-off throttle becomes smaller as the movement amount of the main spool 170 becomes larger, and the bleed-off flowrate decreases.

As described above, in this embodiment, when the main spool 170 of the travel control valve unit 130 is moved in accordance with the travel operation instruction, a part of the working oil supplied from the supply passage 121 is discharged from the second notch 192B functioning as the discharge portion (bleed-off throttle) at the movement initial stage. Thus, immediately after the operation start of the travel operation lever, rapid flowing of the working oil to the travel motor 111 can be suppressed, and start of the travel motor 111 to the travel operation instruction can be made smooth. That is, according to this embodiment, roll, shock or the like of a vehicle body at the traveling start can be prevented, and travel performances at the traveling start can be improved.

When the left and right travel operation levers are operated to the rearward side, the movement of the main spool 170 is opposite to the aforementioned movement, and the first notch 192A illustrated in FIG. 2 functions as the discharge portion (bleed-off throttle). That is, when the main spool 170 is moved from the neutral position (N) to the other in the axial direction, at the movement initial stage, the working oil led from the supply passage 121 to the lead-out passage 123 is supplied to the second actuator passage 125B through the second annular groove 176B, and a part of the working oil led from the supply passage 121 to the lead-out passage 123 is discharged to the discharge passage 129 through the first notch 192A as the discharge portion. Thus, even at the rearward movement, the start of the travel motor 111 to the travel operation instruction can be made smooth, and the travel performances at the traveling start can be improved.

When the operation amount of the travel operation lever to the forward side increases, the opening of the annular recess portion 154 connected to the lead-out passage 123 is closed by the outer peripheral surface of the second lead-out side land portion 172B. That is, the lead-out passage 123 is shut off by the outer peripheral surface of the second lead-out side land portion 172B. As a result, the discharge of the working oil from the lead-out passage 123 to the tank 119 through the second notch 192B ends.

When the operation amount of the travel operation lever is further increased, as illustrated in FIG. 4, the first lead-out passage 123A and the first travel communication path 124A communicate with each other through the first notch 192A. At least when the operation amounts of the left and right travel operation lever become the maximum values on the forward side, respectively, the first travel communication path 124A of the left travel control valve unit 130L and the first travel communication path 124A of the right travel control valve unit 130R communicate with each other.

Here, in the case where the travel communication path 124 is not provided, if there is a machining error in the left and right travel control valves 131L and 131R, the pressure compensation valve 140 and the like, the working oil supplied to the left and right travel motors 111L and 111R is biased, and there is a concern that turning occurs during traveling.

On the other hand, in this embodiment, when the main spool 170 is moved to the one in the axial direction from the neutral position (N), at the movement final stage thereof, the lead-out passage 123 and the travel communication path 124 communicate with each other through the first notch 192A as the communication portion provided on the lead-out side land portion 172. Therefore, if the flowrate to the one of the left and right travel motors 111L and 111R becomes larger than the flowrate to the other due to the machining error in the left and right travel control valves 131L and 131R, the pressure compensation valve 140 and the like, a part of the working oil is led from one of the circuits of the left and right travel motors 111L and 111R to the other circuit through the travel communication path 124. As a result, the flowrate of the working oil is adjusted so that the flowrates of the working oil supplied to the left and right travel motors 111L and 111R become equal.

As described above, in this embodiment, when the travel operation instruction is input into each of the left and right travel control valve units 130L and 130R, and the main spool 170 of the left and right travel control valve units 130L and 130R is moved, at the movement final stage of the main spool 170, the lead-out passages 123 on the downstream side of the meter-in throttle 134 in the left and right travel control valve units 130L and 130R communicate with each other through the first notch 192A as the communication portion. Thus, variation in the supply flowrates of the working oil to the left and right travel motors 111L and 111R can be suppressed. That is, according to this embodiment, occurrence of turning during traveling can be prevented when the left and right travel operation levers are operated to the maximum to the forward side, and travel performances in straight travel can be improved.

When the left and right travel operation levers are operated to the maximum to the rearward side, the movement of the main spool 170 is opposite to the movement above, and the second notch 192B illustrated in FIG. 2 functions as the communication portion. That is, when the main spool 170 is moved to the other in the axial direction from the neutral position (N), at the movement final stage thereof, the lead-out passage 123 and the travel communication path 124 communicate with each other through the second notch 192B as the communication portion, and the lead-out pasasges 123 in the left and right travel control valve units 130L and 130R communicate with each other. Thus, the straight travel performances can be improved at rearward traveling.

According to the aforementioned embodiment, the following working effects are exerted.

(1) When the main spool 170 is moved to the one from the neutral position (N), at the movement initial stage thereof, the discharge portion discharging a part of the working oil led from the supply passage 121 to the lead-out passage 123 to the discharge passage 129 is provided in the main spool 170. When the vehicle goes forward, the second notch 192B functions as the discharge portion, while when the vehicle goes rearward, the first notch 192A functions as the discharge portion. As a result, start of the travel motor 111 to the travel operation instruction can be made smooth, and travel performances at the traveling start can be improved.

(2) Moreover, when the main spool 170 is moved to the one from the neutral position (N), at the movement final stage thereof, the communication portion causing the lead-out passage 123 and the travel communication path 124 to communicate with each other is provided in the main spool 170. When the vehicle goes forward, the first notch 192A functions as the communication portion, while when the vehicle goes rearward, the second notch 192B functions as the communication portion. As a result, variation in the supply flowrates in the working oil to the left and right travel motors 111L and 111R can be suppressed, and travel performances in the straight travel can be improved.

(3) The improvement of the travel performances of the aforementioned (1) and (2) is realized by the discharge portion and the communication portion provided in the main spool 170. Thus, since there is no need to incorporate a switching valve or the like for switching communication and shut-off between the lead-out passages 123 of the left and right travel control valve units 130L and 130R in the valve device 100, the size of the valve device 100 can be reduced. Moreover, since the number of components can be reduced, the costs of the valve device 100 can be also reduced. That is, according to this embodiment, the valve device 100 which can improve the travel performances and can reduce the size can be provided.

(4) When the main spool 170 is moved to the one in the axial direction from the neutral position (N), the second notch 192B functions as the discharge portion at the movement initial stage, and the first notch 192A functions as the communication portion at the movement final stage. Moreover, when the main spool 170 is moved to the other in the axial direction from the neutral position (N), the first notch 192A functions as the discharge portion at the movement initial stage and the second notch 192B functions as the communication portion at the movement final stage.

That is, the one type of notches 192A and 192B provided on the lead-out side land portion 172 includes both the function as the communication portion causing the lead-out passage 123 and the travel communication path 124 to communicate with each other and the function as the discharge portion (bleed-off throttle) causing the lead-out passage 123 and the discharge passage 129 to communicate with each other. By making the one type of notches 192A and 192B formed on the lead-out side land portion 172 function as the discharge portion and the communication portion, the travel performances at the start and the travel performances in straight travel can be improved. Therefore, since the configuration of the main spool 170 can be simplified as compared with the case of individually providing the discharge portion and the communication portion, manufacturing costs can be reduced.

Second Embodiment

Figure 5A:
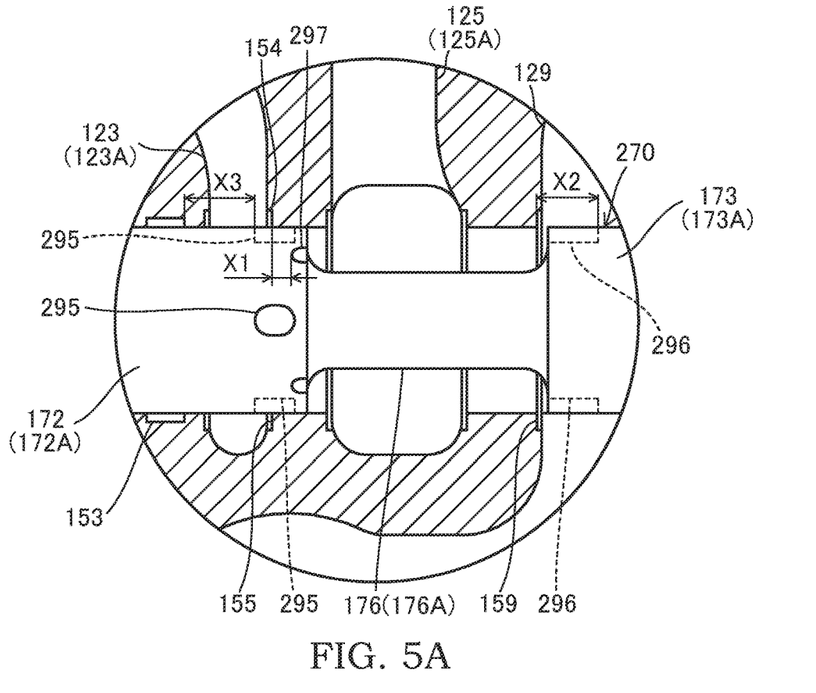
FIG. 5A is an enlarged sectional view illustrating a part of the travel control valve unit of the valve device according to a second embodiment of the present invention in an enlarged manner and illustrates a state where the main spool is at the neutral position.
Figure 5B:
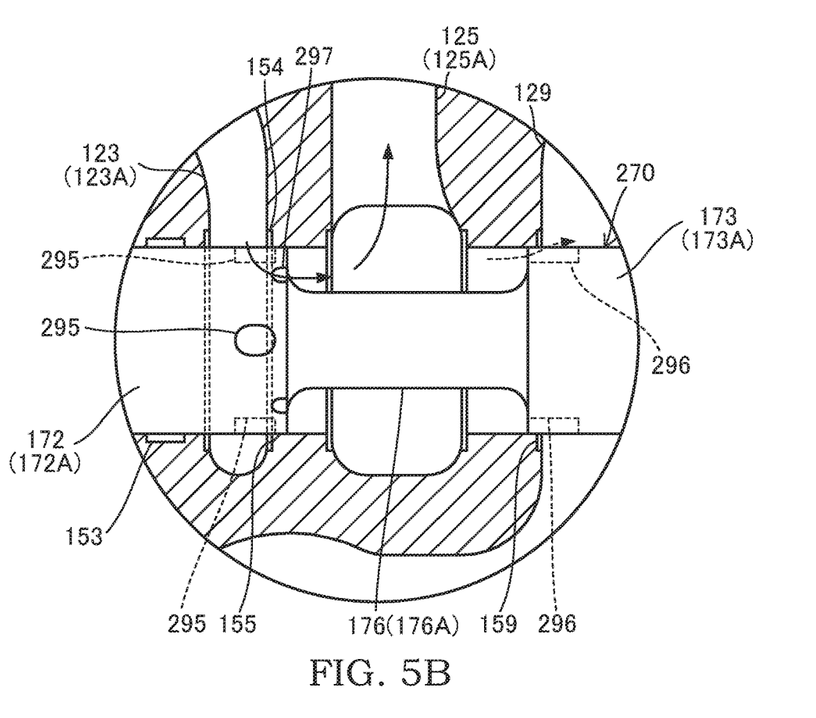
FIG. 5B is an enlarged sectional view illustrating a part of the travel control valve unit of the valve device according to the second embodiment of the present invention in an enlarged manner and illustrates a state where the main spool has been moved from the neutral position only by a predetermined distance X1.
Figure 6A:
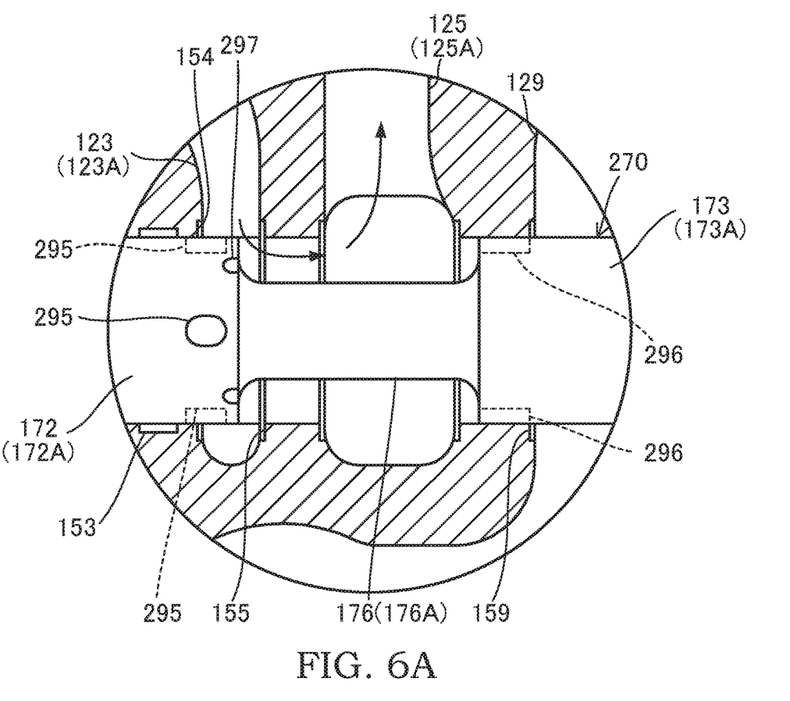
FIG. 6A is an enlarged sectional view illustrating a part of the travel control valve unit of the valve device according to the second embodiment of the present invention in an enlarged manner and illustrates a state where the main spool has been moved from the neutral position only by a predetermined distance X2.
Figure 6B:
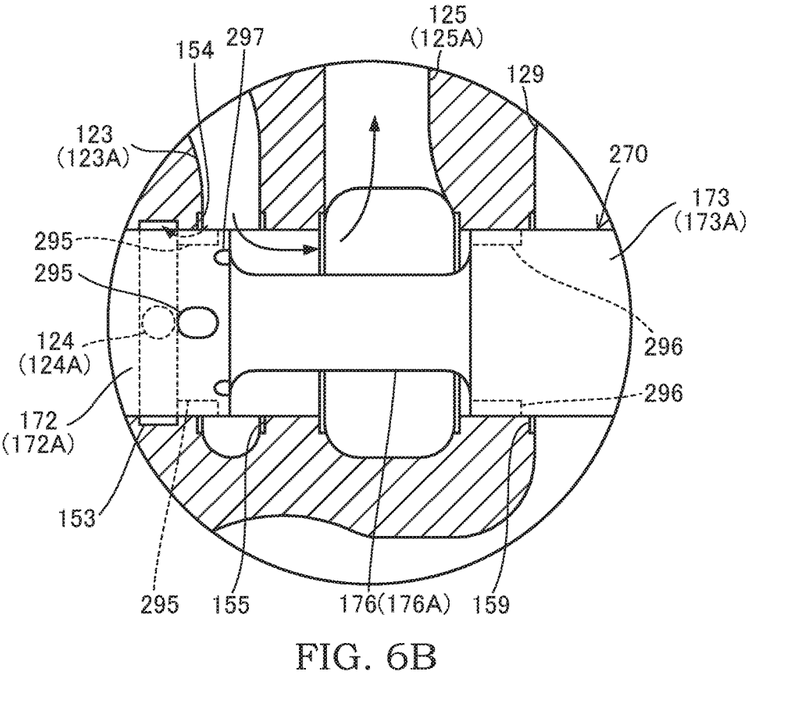
FIG. 6B is an enlarged sectional view illustrating a part of the travel control valve unit of the valve device according to the second embodiment of the present invention in an enlarged manner and illustrates a state where the main spool has been moved from the neutral position only by a predetermined distance X3.

A valve device according to a second embodiment of the present invention will be described by referring to FIGS. 5A, 5B, 6A, and 6B. Hereinafter, different points from the aforementioned first embodiment will be mainly described, and the same reference numerals are given to the configurations which are the same as or corresponding to the configurations described in the first embodiment in the figures, and description will be omitted. FIGS. 5A to 6B are enlarged sectional views illustrating a part of the travel control valve unit in an enlarged manner. FIG. 5A illustrates a state where a main spool 270 is at the neutral position (N), and FIG. 5B illustrates a state where the main spool 270 is moved from the neutral position (N) only by a predetermined distance X1. FIG. 6A illustrates a state where the main spool 270 is moved from the neutral position (N) only by a predetermined distance X2, and FIG. 6B illustrates a state where the main spool 270 is moved from the neutral position (N) only by a predetermined distance X3.

In the first embodiment, the one type of notches 192A and 192B provided on the lead-out side land portion 172 includes both the function as the communication portion causing the lead-out passage 123 and the travel communication path 124 to communicate with each other and the function as the discharge portion (bleed-off throttle) causing the lead-out passage 123 and the discharge passage 129 to communicate with each other.

On the other hand, in the second embodiment, a recess portion 295 provided on the lead-out side land portion 172 functions as the communication portion causing the lead-out passage 123 and the travel communication path 124 to communicate with each other, and a notch 296 provided on the discharge-side land portion 173 functions as the discharge portion (bleed-off throttle) causing the lead-out passage 123 and the discharge passage 129 to communicate with each other. That will be described below in detail.

As illustrated in FIG. 5A, the annular groove 176 is provided between the lead-out side land portion 172 and the discharge-side land portion 173 in the main spool 270 similarly to the first embodiment. A plurality of notches 296 as the discharge portion (bleed-off throttle) is provided separately in the circumferential direction on the discharge-side land portion 173. The notch 296 is provided so as to extend in the axial direction of the main spool 270. The notch 296 is provided on the discharge-side land portion 173 so as to be opened in the outer peripheral surface thereof and the annular groove 176.

The recess portion 295 as the communication portion is provided separately in the circumferential direction in the lead-out side land portion 172. The recess portion 295 is provided in the lead-out side land portion 172 so as to be opened in the outer peripheral surface thereof and not to be opened in the annular groove 176. For example, the recess portion 295 is formed having a race track shape in which both ends of two sides in parallel with the axial direction of the main spool 270 are connected by arcs as illustrated.

A plurality of notches 297 is provided separately in the circumferential direction on the lead-out side land portion 172. The notch 297 extends in the axial direction of the main spool 270 and is opened in the outer peripheral surface in the lead-out side land portion 172 and the annular groove 176.

The operation of the valve device according to the second embodiment will be described by referring to FIGS. 5A to 6B. The case where the left and right travel operation levers (not shown) are operated to the forward side at the same time so as to cause the hydraulic excavator (vehicle) to travel straightly similarly to the first embodiment will be described.

As illustrated in FIG. 5A, when the travel operation lever is held at the neutral position, the main spool 270 is held at the neutral position (N). When the main spool 270 is at the neutral position (N), similarly to the first embodiment, the communication between the supply passage 121 and the lead-in passage 122 is shut off by the supply-side land portion 171 (See FIG. 2). Moreover, when the main spool 270 is at the neutral position (N), the actuator passage 125 and the discharge passage 129 communicate with each other through the annular groove 176.

As illustrated in FIG. 5A, when the main spool 270 is at the neutral position (N), the opening in the annular recess portion 154 connected to the lead-out passage 123 is closed by the lead-out side land portion 172. That is, when the main spool 270 is at the neutral position (N), the communication between the lead-out passage 123 and the actuator passage 125 is shut off by the lead-out side land portion 172.

When the operation of the travel operation lever is started, and the main spool 270 is moved to the one in the axial direction (left in the illustration) from the neutral position (N), the supply branch passage 121b and the lead-in passage 122 communicate with each other through the second central notch 191B similarly to the first embodiment (see FIG. 3).

When the operation amount of the travel operation lever is increased, and the main spool 270 is moved from the neutral position (N) to the one in the axial direction (left in the illustration) only by the predetermined distance X1, as illustrated in FIG. 5B, the first lead-out passage 123A and the first actuator passage 125A communicate with each other through the notch 297. As a result, as indicated by a solid line arrow in FIG. 5B, most of the working oil led from the supply passage 121 to the lead-out passage 123 through the lead-in passage 122 is supplied to the first actuator passage 125A through the notch 297 and the first annular groove 176A, and the travel motor 111 is rotated.

At this time, the first annular groove 176A communicates with the discharge passage 129 through the notch 296. Thus, as indicated by a broken-line arrow in FIG. 5B, a part of the working oil led from the supply passage 121 to the lead-out passage 123 through the lead-in passage 122 is discharged to the discharge passage 129 through the first annular groove 176A and the notch 296.

That is, when the main spool 270 is moved to the one in the axial direction from the neutral position (N), a part of the working oil led from the supply passage 121 to the lead-out passage 123 at the movement initial stage is discharged to the discharge passage 129 through the notch 296 as the discharge portion (bleed-off throttle) provided on the first discharge side land portion 173A. An area of the throttle opening of the notch 296 as the bleed-off throttle becomes smaller as the movement amount of the main spool 270 becomes larger, and the bleed-off flowrate decreases.

When the operation amount of the travel operation lever is increased, and the main spool 270 is moved from the neutral position (N) to the one in the axial direction (left in the illustration) only by the predetermined distance X2 (>X1), as illustrated in FIG. 6A, the opening of the annular recess portion 159 connected to the discharge passage 129 is closed by the outer peripheral surface of the first discharge-side land portion 173A. That is, the discharge passage 129 is shut off by the outer peripheral surface of the first discharge-side land portion 173A. As a result, the discharge of the working oil from the lead-out passage 123 to the tank 119 through the notch 296 ends.

When the operation amount of the travel operation lever is increased, and the main spool 270 is moved from the neutral position (N) to the one in the axial direction (left in the illustration) only by the predetermined distance X3 (>X2), as illustrated in FIG. 6B, the first lead-out passage 123A and the first travel communication path 124A communicate with each other through the recess portion 295 provided on the first lead-out side land portion 172A. At least when the operation amounts of the left and right travel operation levers become the maximum values on the forward side, respectively, the first travel communication path 124A of the left travel control valve unit 130L and the first travel communication path 124A of the right travel control valve unit 130R communicate with each other.

That is, when the main spool 170 is moved from the neutral position (N) to the one in the axial direction, at the movement final stage thereof, the lead-out passage 123 and the travel communication path 124 communicate with each other through the recess portion 295 as the communication portion provided on the lead-out side land portion 172. Therefore, if there is a machining error in the left and right travel control valves 131L and 131R, the pressure compensation valve 140 and the like, the flowrate of the working oil is adjusted so that the flowrates of the working oil supplied to the left and right travel motors 111L and 111R become equal.

As described above, in the second embodiment, the recess portion 295 as the communication portion causing the lead-out passage 123 and the travel communication path 124 to communicate with each other is provided on the lead-out side land portion 172. Thus, timing when the lead-out passages 123 of the left and right travel control valve units 130 communicate with each other can be set more appropriately by adjusting the axial length of the recess portion 295.

Moreover, the notch 296 as the discharge portion (bleed-off throttle) causing the lead-out passage 123 and the discharge passage 129 to communicate with each other is provided on the discharge-side land portion 173. Thus, by adjusting the axial length of the notch 296, the timing when the opening of the discharge portion (bleed-off throttle) is closed, that is, the timing when discharge of a part of the working oil supplied to the lead-out passage 123 to the tank 119 is stopped can be set more appropriately. For example, the timing when the opening of the discharge portion (bleed-off throttle) is closed can be slowed by extending the axial length of the notch 296.

According to the second embodiment as above, the following working effects are exerted in addition to the working effects similar to (1) to (3) described in the first embodiment.

(5) When the main spool 270 is moved from the neutral position (N) to the one in the axial direction, the timing when the discharge of a part of the working oil supplied to the lead-out pasasge 123 (the timing when the opening of the bleed-off throttle is closed) is controlled by the notch 296 as the discharge portion provided on the discharge-side land portion 173, and the timing when the communication between the lead-out passage 123 and the travel communication path 124 is started can be controlled by the recess portion 295 as the communication portion provided on the lead-out side land portion 172. That is, according to the second embodiment, the timing when the opening of the bleed-off throttle is closed and the timing when the communication between the lead-out passage 123 and the travel communication path 124 is started can be set individually and thus, a degree of freedom of adjustment of the travel performances of the vehicle is high.

(6) Moreover, in the second embodiment, the timing when the lead-out passage 123 and the actuator passage 125 communicate with each other can be controlled by the notch 297 provided on the lead-out side land portion 172. Thus, the start timing of the travel motor 111 can be set more appropriately by adjusting the axial length of the notch 297.

Variation of the Second Embodiment

Figure 7:
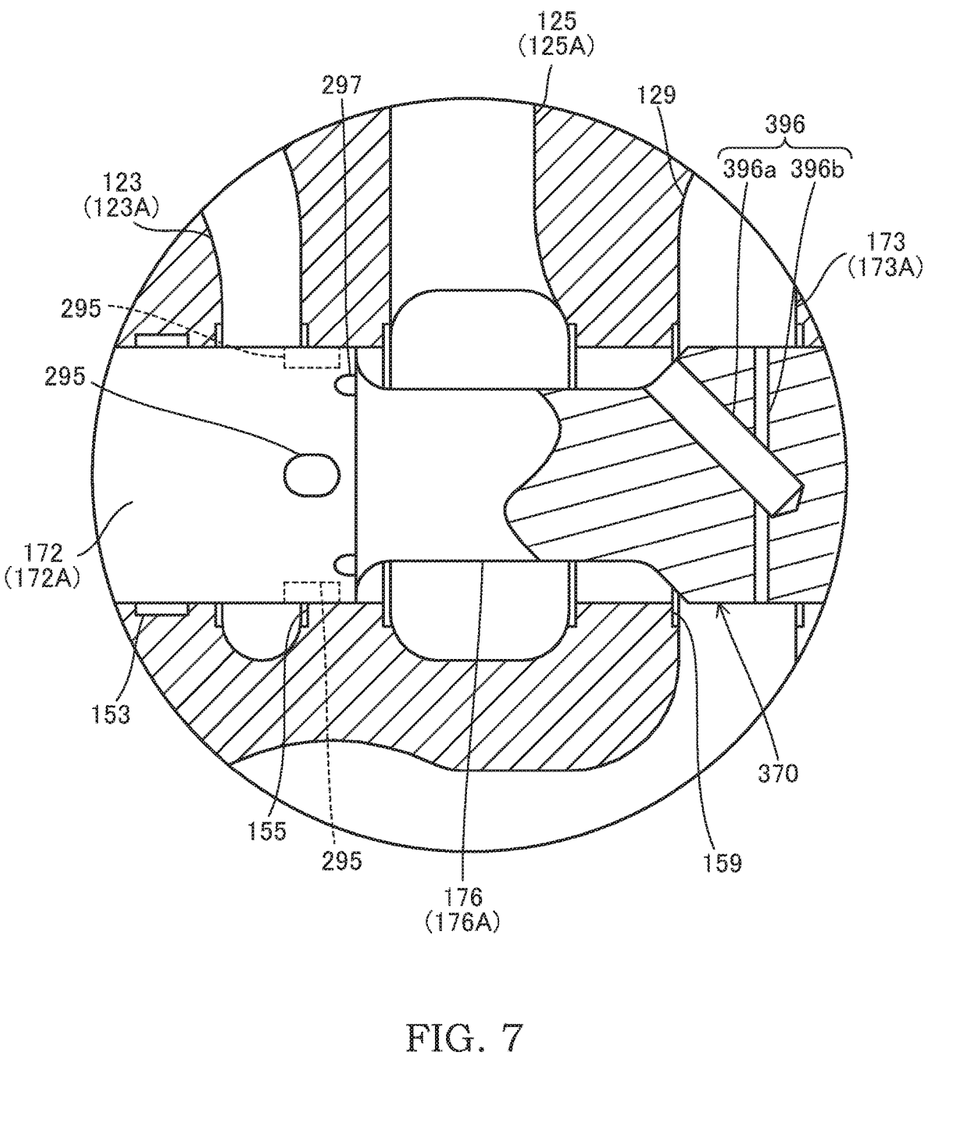
FIG. 7 is an enlarged sectional view illustrating a part of the travel control valve unit of the valve device according to a variation of the second embodiment of the present invention in an enlarged manner, and the discharge portion provided at a discharge-side land portion is illustrated in an enlarged manner.

The discharge portion provided on the discharge-side land portion 173 is not limited to the notch 296 described in the second embodiment. As illustrated in FIG. 7, for example, the discharge portion may be constituted by a plurality of passages.

A discharge portion 396 causing the lead-out passage 123 and the discharge passage 129 to communicate with each other has a first discharge path 396a communicating with the annular groove 176 and a second discharge path 396b communicating with the first discharge path 396a and is opened in the outer peripheral surface of the discharge-side land portion 173. The second discharge path 396b extends to the radial direction of the main spool 370.

According to the variation as above, the working oil discharged to the discharge passage 129 through the discharge portion 396 is discharged from an opening end portion of the second discharge path 396b outward in the radial direction, that is, to the direction orthogonal to the axial direction of the main spool 370.

In the second embodiment above, as indicated by a broken-line arrow in FIG. 5B, since the working oil flows along the axial direction of the main spool 270 toward the discharge passage 129 from the notch 296, a fluid force is generated so as to prevent axial movement of the main spool 270. On the other hand, in this variation, the working oil flows out to the direction orthogonal to the axial direction of the main spool 270 toward the discharge passage 129 from the discharge portion 396 illustrated in FIG. 7. Since the working oil is discharged in the radial direction from the second discharge path 396b of the discharge-side land portion 173, the generation of the fluid force which prevents the axial movement of the main spool 370 can be suppressed. That is, prevention of the axial movement of the main spool 370 by the working oil flowing out from the discharge portion 396 to the discharge passage 129 can be suppressed.

Variations as follows are also within the range of the present invention, and the constitutions described in the variation and the constitutions described in the aforementioned embodiments can be combined, the constitutions described in the aforementioned different embodiments can be combined or the constitutions described in the following different variations can be also combined.

Variation 1

In the first embodiment, the example in which the discharge portion (the notches 192A and 192B) controlling the bleed-off flowrate is provided on the lead-out side land portion 172 is described, and in the second embodiment, the example in which the discharge portion (the notch 296) is provided on the discharge-side land portion 173 is described, but the present invention is not limited to them. The discharge portion may be provided on both the lead-out side land portion 172 and the discharge-side land portion 173.

Variation 2

In the aforementioned embodiment, the example in which the after-orifice type load sensing system in which the pressure compensation valve 140 is connected to the downstream side of the main spool 170 of the travel control valve 131 is employed is described, but the present invention is not limited to that. A before-orifice type load sensing system in which the pressure compensation valve 140 is connected to the upstream side of the main spool 170 of the travel control valve 131 may be employed.

The constitutions, actions, and effects of the embodiments of the present invention constituted as above will be described collectively.

The valve device 100 is a valve device including the left and right travel control valve units 130 adapted to control the flow of the working fluid supplied from the fluid pressure pump (the pump 110) to the left and right travel motors 111, and each of the left and right travel control valve units 130 includes the spool (the main spools 170, 270, and 370) adapted to be moved in the axial direction on the basis of the travel operation instruction and the valve body (the valve block B) slidably accommodating the spool (the main spools 170, 270, and 370), the valve body (the valve block B) has the supply passage 121 to which the working fluid discharged from the fluid pressure pump (the pump 110) is supplied, the actuator passage 125 communicating with the travel motor 111, the discharge passage 129 communicating with the tank 119, the lead-out passage 123 leading the working fluid supplied from the supply passage 121 to the actuator passage 125, and the communication path (the travel communication path 124) causing the lead-out passages 123 of the left and right travel control valve units 130 to communicate with each other, the spool (the main spools 170, 270, and 370) has the lead-out side land portion 172 which is the land portion adapted to cause communication or shut-off of the communication between the lead-out passage 123 and the communication path (the travel communication path 124) and capable of shutting off the lead-out passage 123 by the outer peripheral surface thereof, the discharge-side land portion 173 which is the land portion adapted to cause communication or shut-off of the communication between the actuator passage 125 and the discharge passage 129 and capable of shutting off the discharge passage 129 by the outer peripheral surface thereof, the discharge portion (the first notch 192A, the second notch 192B, the notch 296, and the discharge portion 396) provided at least on either one of the lead-out side land portion 172 and the discharge-side land portion 173 and adapted to discharge a part of the working fluid led from the supply passage 121 to the lead-out passage 123 to the discharge passage 129 at the movement initial stage thereof when the spool (the main spools 170, 270, and 370) is moved to the one from the neutral position, and the communication portion (the first notch 192A, the second notch 192B, and the recess portion 295) provided on the lead-out side land portion 172 and adapted to cause the lead-out passage 123 and the communication path (the travel communication path 124) to communicate with each other at the movement final stage thereof when the spool (the main spools 170, 270, and 370) is moved to the one from the neutral position.

In this constitution, when the spool (the main spools 170, 270, and 370) of the travel control valve unit 130 is moved in accordance with the travel operation instruction, at the movement initial stage thereof, since a part of the working fluid supplied from the supply passage 121 is discharged from the discharge portion (the first notch 192A, the second notch 192B, the notch 296, and the discharge portion 396), start of the travel motor 111 to the travel operation instruction can be made smooth. Moreover, when the travel operation instruction is input to each of the left and right travel control valve units 130, and the spool (the main spools 170, 270, and 370) of the left and right travel control valve units 130 is moved, at the movement final stage of the spool (the main spools 170, 270, and 370), the lead-out passages 123 in the left and right travel control valve units 130 communicate with each other through the communication portion (the first notch 192A, the second notch 192B, and the recess portion 295) and thus, variation in the supply flowrate of the working fluid to the left and right travel motors 111 can be suppressed. As a result, the travel performances at the traveling start and in the straight travel can be improved. Moreover, the aforementioned improvement of the travel performances is realized by the discharge portion (the first notch 192A, the second notch 192B, the notch 296, and the discharge portion 396) and the communication portion (the first notch 192A, the second notch 192B, and the recess portion 295) provided on the spool (the main spools 170, 270, and 370). Thus, since there is no need to incorporate a switching valve or the like adapted to switch between communication and shut-off between the lead-out passages 123 of the left and right travel control valve units 130 in the valve device 100, the size of the valve device 100 can be reduced. That is, according to the aforementioned constitution, the valve device 100 which can improve the travel performances and realize the size reduction can be provided.

In the valve device 100, the spool (the main spool 170) has the first lead-out side land portion 172A and the second lead-out side land portion 172B which are the pair of lead-out side land portions 172, the first discharge-side land portion 173A and the second discharge-side land portion 173B which are the pair of discharge-side land portions 173, the first annular groove 176A provided between the first discharge-side land portion 172A and the first discharge-side land portion 173A, and the second annular groove 176B provided between the second lead-out side land portion 172B and the second discharge-side land portion 173B, the first notch 192A which is opened in the first annular groove 176A is provided in the first lead-out side land portion 172A, the second notch 192B which is opened in the second annular groove 176B is provided in the second lead-out side land portion 172B, the valve body (valve block B) has the first actuator passage 125A as the actuator passage 125 communicating with the first annular groove 176A and the second actuator passage 125B as the actuator passage 125 communicating with the second annular groove 176B, when the spool (the main spool 170) is moved to the one from the neutral position, at the movement initial stage thereof, the working fluid led from the supply passage 121 to the lead-out passage 123 is supplied to the first actuator passage 125A through the first annular groove 176A, and a part of the working fluid led from the supply passage 121 to the lead-out passage 123 is discharged to the discharge passage 129 through the second notch 192B as the discharge portion, when the spool (the main spool 170) is moved to the one from the neutral position, at the movement final stage thereof, the lead-out passage 123 and the communication path (the travel communication path 124) communicate with each other through the first notch 192A as the communication portion, when the spool (the main spool 170) is moved to the other from the neutral position, at the movement initial stage thereof, the working fluid led from the supply passage 121 to the lead-out passage 123 is supplied to the second actuator passage 125B through the second annular groove 176B, and a part of the working fluid led from the supply passage 121 to the lead-out passage 123 is discharged to the discharge passage 129 through the first notch 192A as the discharge portion, and when the spool (the main spool 170) is moved to the other from the neutral position, at the movement final stage, the lead-out passage 123 and the communication path (the travel communication path 124) communicate with each other through the second notch 192B as the communication portion.

In this constitution, when the spool (the main spool 170) is moved to the one from the neutral position, the second notch 192B functions as the discharge portion at the movement initial stage, and the first notch 192A functions as the communication portion at the movement final stage. Moreover, when the spool (the main spool 170) is moved to the other from the neutral position, the first notch 192A functions as the discharge portion at the movement initial stage, and the second notch 192B functions as the communication portion at the movement final stage. That is, the travel performances at the start and the travel performances in the straight travel can be improved by causing the notches 192A and 192B formed on the lead-out side land portion 172 to function as the discharge portion and the communication portion.

In the valve device 100, the spool (the main spools 270 and 370) has the annular groove 176 provided between the lead-out side land portion 172 and the discharge-side land portion 173, and the discharge portion (the notch 296 and the discharge portion 396) is provided in the discharge-side land portion 173 so as to be opened in the outer peripheral surface thereof and the annular groove 176, and the communication portion (the recess portion 295) is provided in the lead-out side land portion 172 so as to be opened in the outer peripheral surface thereof and not to be opened in the annular groove 176.

In this constitution, when the spool (the main spools 270 and 370) is moved to the one from the neutral position, the timing when the discharge of a part of the working fluid supplied to the lead-out passage 123 is stopped is controlled by the discharge portion (the notch 296 and the discharge portion 396) provided on the discharge-side land portion 173, and the timing when the communication between the lead-out passage 123 and the communication path (the travel communication path 124) is started can be controlled by the communication portion (the recess portion 295) provided on the lead-out side land portion 172.

In the valve device 100, the discharge portion 396 has the first discharge path 396a communicating with the annular groove 176 and the second discharge path 396b communicating with the first discharge path 396a and is opened in the outer peripheral surface of the discharge-side land portion 173, and the second discharge path 396b extends to the radial direction of the spool (the main spool 370).

In this constitution, since the working fluid is discharged to the radial direction from the second discharge path 396b of the discharge-side land portion 173, generation of the fluid force which prevents the movement of the spool (the main spool 370) can be suppressed.

In the valve device 100, the notch 297 opened in the annular groove 176 is provided in the lead-out side land portion 172, and when the spool (the main spools 270 and 370) is moved from the neutral position, the notch 297 causes the lead-out passage 123 and the actuator passage 125 to communicate with each other.

In this constitution, the timing when the lead-out passage 123 and the actuator passage 125 to communicate with each other can be controlled by the notch 297.

Embodiments of the present invention were described above, but the above embodiments are merely examples of applications of the present invention, and the technical scope of the present invention is not limited to the specific constitutions of the above embodiments.

This application claims priority based on Japanese Patent Application No. 2018-129127 filed with the Japan Patent Office on Jul. 6, 2018, the entire contents of which are incorporated into this specification by reference.

The invention claimed is:

1. A valve device comprising left and right travel control valve units configured to control a flow of a working fluid supplied from a fluid pressure pump to left and right travel motors, wherein
each of the left and right travel control valve units includes:
a spool configured to be moved in an axial direction on the basis of a travel operation instruction; and
a valve body slidably accommodating the spool;
the valve body has:
a supply passage to which the working fluid discharged from the fluid pressure pump is supplied;
an actuator passage communicating with the travel motor;
a discharge passage communicating with a tank;
a lead-out passage leading the working fluid supplied from the supply passage to the actuator passage; and
a communication path causing the lead-out passages of the left and right travel control valve units to communicate with each other;
the spool has:
a lead-out side land portion which is a land portion configured to cause communication or shut-off of the communication between the lead-out passage and the communication path, the lead-out side land portion being capable of shutting off the lead-out passage by an outer peripheral surface thereof;
a discharge-side land portion which is the land portion configured to cause communication or shut-off of the communication between the actuator passage and the discharge passage, the discharge-side land portion being capable of shutting off the discharge passage by the outer peripheral surface thereof;
a discharge portion provided at least either one of the lead-out side land portion and the discharge-side land portion and configured to discharge a part of the working fluid led from the supply passage to the lead-out passage to the discharge passage at a movement initial stage thereof when the spool is moved to one from the neutral position; and
a communication portion provided on the lead-out side land portion and configured to cause the lead-out passage and the communication path to communicate with each other at a movement final stage thereof when the spool is moved to the one from the neutral position.

2. The valve device according to claim 1, wherein the spool has:
 a first lead-out side land portion and a second lead-out side land portion which are a pair of the lead-out side land portions;
 a first discharge-side land portion and a second discharge-side land portion which are a pair of the discharge-side land portion;
 a first annular groove provided between the first lead-out side land portion and the first discharge-side land portion; and
 a second annular groove provided between the second lead-out side land portion and the second discharge-side land portion;
a first notch opened in the first annular groove is provided in the first lead-out side land portion;
a second notch opened in the second annular groove is provided in the second lead-out side land portion;
the valve body has:
 a first actuator passage which is the actuator passage communicating with the first annular groove; and
 a second actuator passage which is the actuator passage communicating with the second annular groove;
when the spool is moved to the one from the neutral position, at the movement initial stage thereof, the working fluid led from the supply passage to the lead-out passage is supplied to the first actuator passage through the first annular groove, and a part of the working fluid led from the supply passage to the lead-out passage is discharged to the discharge passage through the second notch as the discharge portion;
when the spool is moved to the one from the neutral position, at the movement final stage thereof, the lead-out passage and the communication path communicate with each other through the first notch as the communication portion;
when the spool is moved to the other from the neutral position, at the movement initial stage thereof, the working fluid led from the supply passage to the lead-out passage is supplied to the second actuator passage through the second annular groove, and a part of the working fluid led from the supply passage to the lead-out passage is discharged to the discharge passage through the first notch as the discharge portion; and
when the spool is moved to the other from the neutral position, at the movement final stage, the lead-out passage and the communication path communicate with each other through the second notch as the communication portion.

3. The valve device according to claim 1, wherein
the spool has an annular groove provided between the lead-out side land portion and the discharge-side land portion;
the discharge portion is provided in the discharge-side land portion, the discharge portion being opened in an outer peripheral surface in the discharge-side land portion and the annular groove; and
the communication portion is provided in the lead-out side land portion, the communication portion being opened in the outer peripheral surface in the lead-out side land portion and not opened in the annular groove.

4. The valve device according to claim 3, wherein
the discharge portion has
 a first discharge path communicating with the annular groove; and
 a second discharge path communicating with the first discharge path and is opened in the outer peripheral surface of the discharge-side land portion; and
the second discharge path extends to a radial direction of the spool.

5. The valve device according to claim 3, wherein
a notch opened in the annular groove is provided in the lead-out side land portion; and
when the spool is moved from the neutral position, the notch causes the lead-out passage and the actuator passage to communicate with each other.

* * * * *